Figure 1:
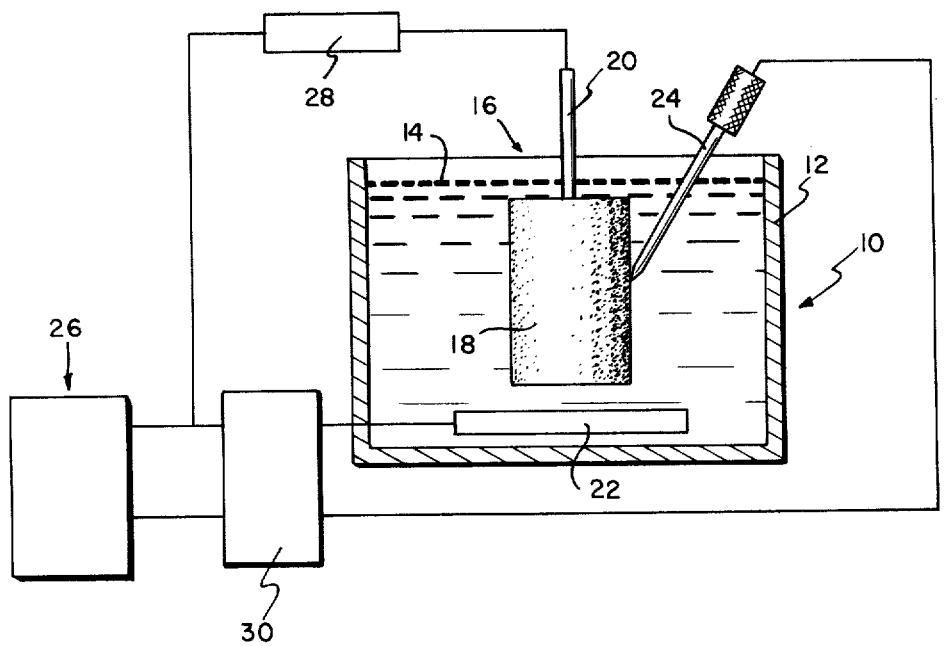

United States Patent [19]

Weaver

[11] 4,000,046
[45] Dec. 28, 1976

[54] METHOD OF ELECTROPLATING A CONDUCTIVE LAYER OVER AN ELECTROLYTIC CAPACITOR

[75] Inventor: Charles A. Weaver, Indianapolis, Ind.

[73] Assignee: P. R. Mallory & Co., Inc., Indianapolis, Ind.

[22] Filed: Dec. 23, 1974

[21] Appl. No.: 536,013

[52] U.S. Cl. .............................. 204/38 R; 204/42; 204/231

[51] Int. Cl.² ...................... C25D 5/54; C25D 7/00

[58] Field of Search .............. 204/38 A, 38 B, 23, 204/228, 231, 42, 38 R

[56] References Cited
UNITED STATES PATENTS

| | | | |
|---|---|---|---|
| 2,215,890 | 9/1940 | Taylor | 204/38 B |
| 2,930,951 | 3/1960 | Burger et al. | 204/38 A |
| 3,231,800 | 1/1966 | Scherr et al. | 317/258 |
| 3,248,618 | 4/1966 | Szpak et al. | 317/258 |
| 3,292,053 | 12/1966 | Giacomo | 204/38 A |
| 3,316,463 | 4/1967 | Comado et al. | 317/230 |
| 3,343,047 | 9/1967 | Comado et al. | 317/230 |
| 3,439,231 | 4/1969 | Booe | 317/230 |
| 3,850,764 | 11/1974 | Herczog | 204/42 |

*Primary Examiner*—T. M. Tufariello
*Attorney, Agent, or Firm*—Hoffmann, Meyer & Coles

[57] ABSTRACT

A method is provided for electroplating a solid electrolyte film-forming metal capacitor. The method includes placing an electroprocessed capacitor in an electroplating vessel which contains a plating source and electroplating solution, providing a voltage source and connecting the positive terminal of the voltage source to the anode side of the capacitor and to the plating source and the negative terminal of the voltage source to a conducting layer on the anode body, and then electroplating a layer containing metal over the capacitor. Any metal which can be plated may be used, such metals include electrically conductive metals such as silver, gold, copper, nickel, and mixtures thereof. The electroplated layer over the capacitor provides greater resistance to mechanical shock and allows the welding of a cathode termination means to the electroplated layer of the capacitor.

15 Claims, 6 Drawing Figures

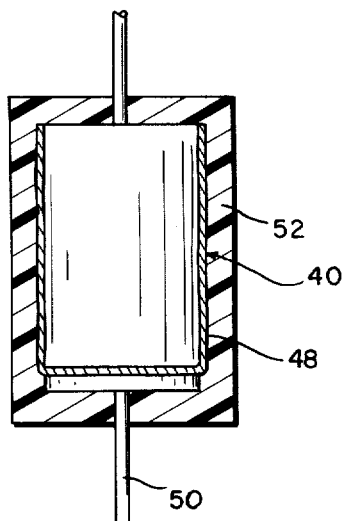
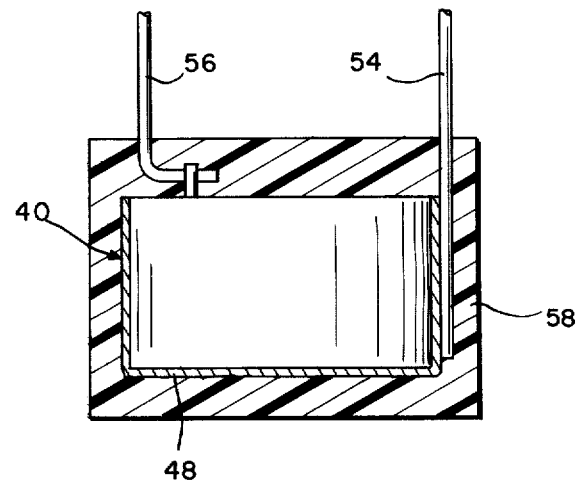
FIG. 3a          FIG. 3b
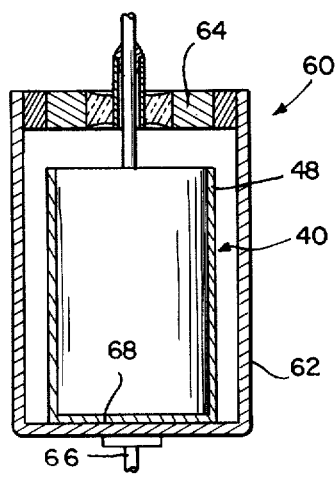
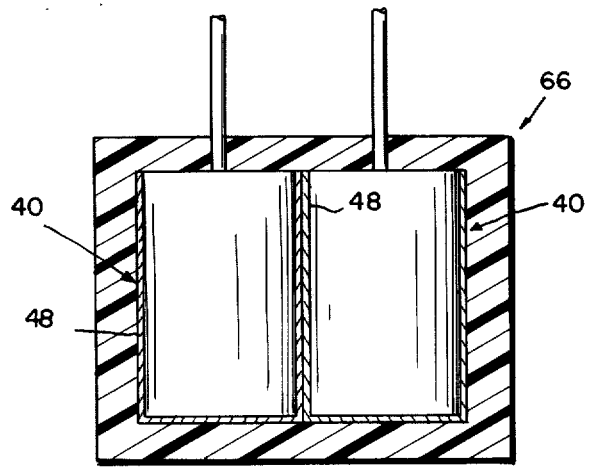
FIG. 3c          FIG. 4

METHOD OF ELECTROPLATING A CONDUCTIVE LAYER OVER AN ELECTROLYTIC CAPACITOR

The present invention generally relates to capacitors and capacitor manufacture. More specifically, the invention relates to solid electrolyte film-forming metal capacitors, especially solid tantalum capacitors.

Solid electrolyte film-forming metal capacitors generally comprise a porous film-forming metal anode body, a metallic lead or riser projecting from the anode body, a dielectric oxide film over the anode body, a semiconducting layer over the dielectric oxide film, a conducting layer or layers over the semiconducting layer, a cathode lead or electrical connection to the conducting layer, and a encapsulating means over the layered anode body. The film-forming metal of the anode body is generally selected from the group consisting of aluminum, titanium, zirconium, tantalum and niobium, the preferred metal being tantalum. The term "anode" is used herein to include both the porous film-forming metal anode body and the anode riser.

In the manufacture of solid electrolyte film-forming metal capacitors, for example, tantalum capacitors, tantalum powder is pressed and sintered to provide a porous anode body. Typically, a metallic riser, usually composed of the same metal as the powder, is inserted into the powder during pressing. The metallic riser, usually termed an anode riser, provides external electrical connection for the anode side of the finished capacitor. A dielectric tantalum oxide film is then formed over the porous anode body by immersing the body in an acidic solution such as a weak phosphoric acid solution and then applying a voltage potential between the body and a counter-electrode immersed in the solution. This step of forming an oxide film is generally referred to as anodization. The anode is then dipped into a solution of manganese nitrate ($Mn(NO_3)_2$), and upon removal from the solution is treated with heat and steam to convert or pyrolyze the manganese nitrate contained in solution and adhering to the porous anode to manganese oxide ($MnO_2$), a semiconducting material. This operation is repeated until there is substantially uniform layer of $MnO_2$ over the whole anode body. The anode body is then coated with a layer of graphite by dipping the anode body in a suspension containing colloidal graphite. Over the graphite layer, another electrically conductive layer is applied, typically by applying one or more coats of a silver-based conductive paint. Then the anode body is dipped into a molten solder bath so a layer of solder is formed over the conductive layer. The resultant solder layer provides a cathode connection and provides means for attachment of the cathode lead. Usually the attachment of the cathode lead and the application of the solder layer are accomplished in the same operation. The layered anode body, now an operable capacitor, may then be encapsulated, usually with a thermoplastic or thermosetting resin.

One significant problem of electrolytic film-forming metal capacitors of the type as outlined above is that part of the electrically conductive layer such as silver paint often times peels away from the layers beneath it and thereby harmfully affects the electrical connection of the cathode side of the capacitor. This peeling of part of the conductive layer is due to several factors, one of which may be the use of fluxes in conjunction with the application of the solder layer over the conductive layer. Another factor may be the relatively high temperatures at which the solder layer is applied which could cause thermal shock. Whatever the reasons, a considerable number of capacitor rejects are due to peeling of part of the thin conductive layer away from the remainder of the anode body. These rejects may be manifested as blown off silver paint, high dissipation factor, high impedance or open circuits in the capacitors.

Another significant problem of electrolytic film-forming metal capacitors of the above type is that since the cathode connection or termination is made to the solder layer, the joint or bond between the termination and the layer is oftentimes weak, especially when the capacitor is subjected to elevated temperatures. The solder layer itself may be unable to withstand the mechanical shock associated with normal handling during and after manufacture.

In addition, the solder layer does not always adhere to a conductive layer such as silver paint due to oxidation of portions of the conductive layer and thus the solder layer may peel and good electrical contact may not be made between the solder layer and the conductive layer. A further problem is that the soldering operation may not produce solder layers of uniform thickness which may affect the electrical characteristics of the finished capacitor or which may adversely affect the dimensional tolerances of the capacitor. Also since a flux must generally be used in the application of the solder layer, long alcohol rinses of up to a half hour in duration are required to remove the flux from the capacitor after application of the solder layer.

Because of the above problems, it should be apparent that an effective means of providing an electrically conductive layer over the cathode side of an electrolytic film-forming metal capacitor would be very desirable. It is therefore a feature of the present invention to provide a method for electroplating a metal containing layer over the body of an electrolytic film-forming metal capacitor. Yet another feature of the present invention is that the method of electroplating a conductive layer over a capacitor does not significantly damage the dielectric oxide layer of the anode body. Another feature of the present invention is that the tendency for peeling of the conductive layers in an electroplated film-forming metal anode for a capacitor is reduced.

Yet another feature of the present invention is that by electroplating a conductive layer onto a capacitor body, the conductive layer is more uniform in thickness. Another feature of the present invention is that by providing an electroplated conductive layer over the capacitor body, the cathode termination means may be welded onto the capacitor, thereby yielding a stronger joint or bond between the termination means and the capacitor. Yet another feature of the present invention is that the cathode termination means may be attached to the capacitor by the electroplated layer itself. Yet another feature of the present invention is that the harder electroplated conductive layer over the capacitor helps to make the capacitor less sensitive to mechanical shock due to normal handling during and after capacitor manufacture. Another feature of the present invention is that by the use of a harder electroplated layer, a thinner semiconducting layer may be used which may reduce the dissipation factor for the capacitor. Another feature of the present invention is that the electroplated layer has less tendency to peel away from the capacitor than does conventional solder layers. Another feature of the present invention is that an electroplated layer facilitates the attachment of a capacitor to another capacitor or to a protective container.

These and various other features of this invention as well as many specific advantages will become more fully apparent from a detailed consideration of the remainder of this disclosure including the examples and the appended claims in conjunction with the accompanying drawings in which;

FIG. 1 of the drawing is a schematic of the apparatus used to provide an electroplated layer on a capacitor.

Figure 2:
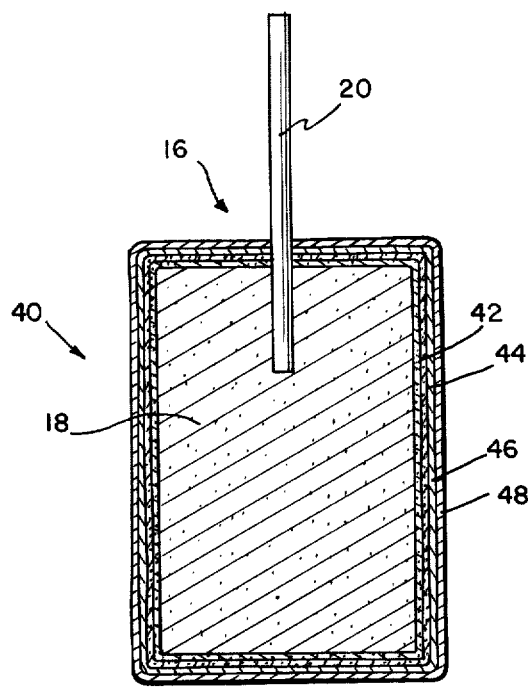

FIG. 2 of the drawing is a cross-sectional view of a film-forming metal capacitor having an electroplated layer.

FIGS. 3a, 3b and 3c of the drawing are cross-sectional views of several capacitors showing several configurations for termination of the capacitor.

FIG. 4 of the drawing is a cross-sectional view of two capacitors having an electroplated conductive layer welded together to form a non-polar type capacitor.

Generally, the present invention relates to a method of depositing material over an electrode comprising the steps of providing a first electrode with a dielectric oxide film thereon and a second electrode contiguous to the dielectric oxide film, maintaining the voltage potential of the first electrode different from the voltage potential of the second electrode to retain the dielectric nature of the oxide film during deposition of material over the second electrode, and depositing material from a fluid over the second electrode using electrical forces and the device resultant therefrom. In one embodiment, the present invention relates to a method of electroplating a conductive metal containing layer over an electrolytic film-forming metal capacitor and the resultant capacitor. More specifically, the method comprising providing a film-forming metal capacitor anode having anode termination means and an anode body, the anode body having a dielectric oxide layer, a semiconductive layer over the dielectric oxide layer, and a conducting layer over the semiconducting layer, placing the layered anode, now an operable capacitor, in an electroplating vessel which contains a plating source and an electroplating solution containing metal ions, providing a voltage source having a positive and negative terminal, electrically connecting the positive terminal to the anode termination means and to the plating source and connecting the negative terminal to the conducting layer on the anode body; electroplating a layer containing metal over a conducting layer while maintaining a positive bias on the anode side of the capacitor, and removing the capacitor from the vessel.

The present invention can be more clearly understood by making reference to the drawing. FIG. 1 is a cross-sectional view of an apparatus that may be used in the method of applying an electroplated layer over a capacitor. Apparatus 10 includes vessel 12 containing an electroplating solution 14. A capacitor 16 comprising anode body 18 and anode riser 20 is partially immersed in the electroplating solution 14. Also located in the vessel 12 is plating source 22 which functions as a source for metal ions in the electroplating solution 14 and probe 24 which contacts the external surface of the anode body 18. A voltage source 26 is connected to the plating source 22 and the probe 24, the probe being negative with respect to the plating source. Also connected to the voltage source 26 is the anode riser 12 which along with the plating source 22 is positive or neutral with respect to the probe 24. Between the anode riser 20 and the voltage source 26 may be a high ohmic resistor 28 to limit the electrical current into the anode 16 and thus limit electrical leakage current across the dielectric oxide film layer on the anode body.

The purpose of the connection between the voltage source 26 and the anode riser 20 is to prevent excessive current flow through the dielectric oxide layer because solid electrolyte film-forming metal capacitors are polar devices, that is, the dielectric oxide layers will only withstand differences in potential when the film-forming metal anode is positive with respect to the conducting layers forming the cathode over the dielectric oxide layer. If the conductive layers forming the cathode are positive with respect to the anode and excessive current is allowed to flow through the dielectric oxide layer, the oxide layer will quickly break down and the device can no longer function as a capacitor even when the device is returned to the proper polarity.

Optionally, a switching means 30 may be located in the electrical circuit between plating source 22 and probe 24 to realize more efficient electroplating. By slowly alternating the potential between the source 22 and probe 24 or by periodic interruption of the circuit by the switching means 30, the contents of the vessel 12 may be depolarized and more efficient electroplating may result. An example of a sequence of slowly alternating the potential is about one cycle per 14 seconds which may be termed "switching DC". The presently preferred sequence is "on-off", the circuit being energized for a period of time, for example twenty seconds and then being deenergized for another period of time, for example 10 seconds. Whatever the sequence used, the positive bias on the anode termination means should be maintained during all phases of the sequence so that the dielectric oxide layer will not be harmfully affected.

In the operation of apparatus 10, metal is plated out onto the surface of anode body 18 due to the difference in potential between the probe 24 and the plating source 22. The whole surface of the anode body 18 will be plated since the surface is electrically conductive. By having the anode riser 20 connected to the positive side of the voltage source 26, the flow of electrical current across the dielectric oxide layer is limited to one direction by the polarity and thus harmful damage to the dielectric oxide layer is thereby minimized. After electroplating, the capacitor should be thoroughly rinsed to remove entrained electroplating solution.

Generally, the method of the present invention may be used to plate any metal or compound that is capable of being electroplated. For capacitor manufacture, the more electrically conductive metals such as copper, nickel, silver and gold are preferred. Care must be taken to avoid oxidation of an electroplated copper layer and thus copper is less preferred. The presently most preferred metal is nickel because of cost considerations and ease of electroplating.

In general, most common electroplating solutions 14 will operate satisfactorily in the method of the present invention. It has been found that solutions having a pH between about 3.0 and about 9.0 are preferred as there is less likelihood of attack on the semiconductor layer such as $MnO_2$ layer present in the capacitor. Electroplating solutions having a pH between about 3.0 and 7.0 are presently the most preferred. In addition, it has been found that the use of chlorides and sulfides in the electroplating solution should generally be avoided for best results. Also, some chemical brighteners commonly employed in electroplating solutions should be avoided.

Examples of electroplating solutions 14 that may be satisfactory in the plating of capacitors 16 are nickel sulfate solution, a copper pyrophosphate solution, a gold potassiumphosphate solution and a nickel sulfamate solution. Of these solutions, the nickel sulfamate solution is presently preferred.

Generally, the thickness of the applied electroplated conducting layer to a capacitor is limited only by the applied current and the length of time of electroplating. For most small capacitors and common electroplating solution, current densities of about 0.5 to 4.0 amp/in$^2$ and time periods of about 1 to 10 minutes are usually sufficient. If the current density applied is too high, spikes extending out from the electroplated layer may be formed and plating may not be able to be controlled. Of course, if the current applied is too low, the length of time for the electroplating operation may be unnecessarily long. As a general time, capacitors having a higher capacitance value require slightly higher current densities for good electroplating. Normal plating potentials for nickel plating are from 2–10 volts, depending upon the current desired. During electroplating of the conductive layer, it has been found that electroplating proceeds at a faster rate and the resultant electroplated layer is more stress free when the voltage source is alternated between the on and off position. A presently preferred time sequence is about twenty seconds on and about ten seconds off. The preferred temperature of the plating solution during electroplating is about 45° C to about 75° C.

It has been found that for most small capacitors, that, for example, an electroplated conducting layer of nickel need only be a few thousandths of a inch thick if soldering of a cathode termination means to the capacitor is desired. For greater protection from mechanical shock and for being able to weld a cathode termination means to the capacitor, an electroplated nickel conducting layer should be at least about 0.008 inches in thickness. The presently preferred thickness of the electroplated layer is between about 0.002 inches and about 0.025 inches.

Plating source 22 in the plating vessel 12 may be of any convenient shape, however, it has been found that if the plating source is partially or completely around the anode body 18, as opposed to a flat plate beneath the body, plating is faster and more uniform. Plating sources consisting of wire containing the appropriate metal are satisfactory for this purpose.

Although the apparatus 20 as shown in FIG. 1 illustrates the plating of a single capacitor 16, it should be understood that the method of this invention could be easily adapted to electroplate a plurality of capacitors in one operation. Because of their small size, film-forming metal capacitors are generally attached to some type of fixture during capacitor manufacture and such fixtures may be utilized in the electroplating method of the present invention. For example, if the fixture is electrically conductive, the positive electrode of the voltage source could be attached to the fixture and thereby maintain a positive bias on the dielectric oxide film of the capacitor.

FIG. 2 illustrates a cross-sectional view of an electroplated capacitor according to the present invention. Capacitor 40 includes film-forming metal anode 16 containing anode body 18 and anode riser 20. Over anode body 18 is dielectric oxide layer 42 which is in turn covered by semiconducting layer 44, typically composed of manganese dioxide. Over semiconducting layer 44 is a conducting layer or layers 46 and the electroplated conducting layer 48. It should be noted that the thicknesses of layers 42, 44, 46 and 48 relative to the size of anode 16 are greatly exaggerated in the drawing for the purposes of clarity.

Conducting layer 46 is composed of any material that is electrically conductive and which will alloy for good electroplating. Good electrical conductivity in the layer 46 is necessary to produce an even, smooth electroplated layer over the whole capacitor 40. If low electrical conductivity layers are utilized, generally only the area adjacent to the negative probe will be electroplated. A conventional graphite containing conductive material has been found to be useful, usually applied by dipping or painting the capacitor with a suspension of colloidal graphite in liquid vehicle and then evaporating the vehicle. An example of such a suspension is colloidal graphite in water sold under the tradename Aquadag E by Acheson Colloids Co., 2155 Washington Ave., Port Huron, Michigan, U.S.A. It may be desirable to include electrically conductive additives such as powdered silver in the graphite suspension as to increase the electrical conductivity of the conductive layer 46. In addition, conductive paints such as silver, copper, nickel and zinc containing paints may provide the conductive layer 46. Combinations of two or more of the above are possible to provide the conductive layer 48 such as sivler containing paint over a graphite containing layer. A presently preferred conducting layer 48 is the dried product of an extra conductive suspension of graphite in a proprietary vehicle sold under the tradename Dixon Cathode Raytube Dag No. 213 and 217 by Dixon Co. of Jersey City, New Jersey, U.S.A. The most preferred conducting layer on the capacitor is composed of one or more layers composed of the dried product of a mixture of a conventional colloidal graphite suspension (Aquadag) and Dixon Cathode Raytube Dag No. 217, the ratio of the former to the latter being between 4:1 and 10:1.

Although the capacitor shown in FIG. 2 is an operable capacitor, it is generally desirable to encapsulate the capacitor in some type of insulative material to further protect the capacitor from the harmful effects of external environments such as moisture and mechanical shock. Typical methods of encapsulating include molding or dipping in thermosetting or thermoplastic resins or placing the capacitor in a metallic cannister.

The electroplated layer 48 over the capacitor helps provide several important advantages over conventional capacitors. The electroplated layer 48 is of substantially uniform thickness and thus critical dimensions can be controlled. The plated layer 48 is more resistant to mechanical shock such as received in normal handling. By being more resistant to mechanical shock, fewer layers of semiconducting material need to be applied to the capacitor to adequately protect the dielectric oxide film and thus the dissipation factor for the capacitor may be decreased. Long rinses required to remove flux after the soldering operation have been eliminated. Thus considerable amounts of time and labor are saved.

In addition, since the metals normally plated have a higher melting point temperature than does conventional solder, the capacitor according to this invention may be able to withstand higher temperatures in subsequent capacitor processing steps such as heating or aging operations and encapsulation. Thus aging operations can be accelerated and materials having higher melting points can be used for encapsulation of the capacitor. Furthermore, a significant advantage is that the cathode termination means may be welded to the capacitors rather than soldered as is shown in the embodiments of FIG. 3 or two or more capacitors may be welded together to produce a non-polar capacitor as shown in FIG. 4. The embodiments in FIGS. 3 and 4 also show how capacitors may be encapsulated to yield a finished capacitor. In addition, the cathode termination means may be attached to the capacitor by the electroplating operation as is illustrated in a subsequent example.

FIG. 3 illustrates several embodiments of how the cathode termination means may be welded to the electroplated conductive layer.

FIG. 3a shows an axial lead type termination where capacitor 40, similar to the one shown in FIG. 2, has a headed cathode termination means 50 welded to a portion of the electroplated conductive layer 48 of the capacitor. The capacitor 40 is encapsulated with a molded resin case 52. FIG. 3b illustrates a radial lead type termination where capacitor 40, similar to the one shown in FIG. 2 has a hairpin type cathode termination means 54 welded to the electroplated conductive layer 48 and projects in the same direction as anode termination means 56. Capacitor 40 is encapsulated in a resin 58 by either molding or dipping. FIG. 3c illustrates a capacitor 60 of the canned type where capacitor 40 is located in a metal can 62 having a suitable end seal 64 and cathode termination means 66. The electroplated conductive layer 48 of the capacitor is welded to the metal can 62 along the bottom portion 68 so as to provide cathode termination.

FIG. 4 illustrates capacitors 40 each having an electroplated layer 48, welded together to form a radial lead non-polar capacitor 66. Being able to weld the two capacitors 40 together provides a stronger joint between the capacitors than if they were soldered and thus a more reliable operation from the capacitor 66 as a whole. Alternatively, the capacitors 40 may be welded together so as to produce an axial lead non-polar capacitor (not shown).

Several capacitors made according to the present invention and performance data for these capacitors are presented in the following examples. It should be understood that the examples are given for the purpose of illustration only and the examples do not limit the invention as has heretofore been described.

EXAMPLE I

Several small tantalum capacitors are electroplated with nickel and compared to conventionally soldered capacitors of the same size.

Several tantalum capacitors are electroplated in an electroplating vessel similar to the one shown in FIG. 1. The electroplating solution consists essentially of water, about 10 oz. of nickel metal/1 gal. water, about 47 oz. of nickel sulfamate/1 gal. water, about one oz. of an antipitting agent /1 gal. water, and sufficient boric acid to make the pH of the solution about 4.0. The plating source is nickel wire.

The conducting layer for the anodes consists of two layers of graphite produced from a dried conventional colloidal graphite suspension and one layer of extra conductive graphite produced from dried suspension of Dixon Cathode Raytube Dag No. 213 diluted with water in a 1:1 ratio. Each of the anodes is electroplated for about three minutes under an applied voltage of about three volts. The temperature of the plating solution is about 50° C. The thickness of the electroplated layer of nickel is about 0.010 inches and presents a smooth, even appearance over the entire anode body.

Comparison of the electroplated capacitor with similarly processed capacitors which included a conventional solder type layer instead of an electroplated layer shows capacitance, dissipation factor and DC leakage are all approximately the same. Thus there does not appear to be any significant loss of electrical characteristics for capacitors having electroplated layers rather than soldered layers.

In a 2000 hour life test, electroplated capacitors show equivalent if not better reliability than conventional capacitors. The capacitors are tested at 85° C and at rated voltage and the following table indicates the test results.

| Capacitor Rating (ufd/V) | Type | Number | 250hrs | Total Failures (Cumulative) 500hrs | 1000hrs | 2000hrs | |
|---|---|---|---|---|---|---|---|
| 15/20 | Ag Paint | 18 | 0 | 0 | 0 | 0 | |
| 15/20 | Plate | 24 | 2 | 2 | 2 | 2 | |
| 330/6 | Ag Paint | 9 | 1 | 1 | 2 | 3 | |
| 330/6 | Plate | 9 | 0 | 0 | 0 | 0 | |
| 8.2/35 | Ag Paint | 20 | 0 | 0 | 0 | 0 | |
| 8.2/35 | Plate | 12 | 0 | 0 | 0 | 0 | |
| | | | | | | | Failure Rate |
| Total | Ag Paint | 47 | 1 | 1 | 2 | 3 | 4.29% |
| | Plate | 45 | 2 | 2 | 2 | 2 | 2.99% |

Thus the above table indicates that the use of an electroplated nickel layer does not cause significant life test problems.

Testing of the same capacitors after welding of the cathode termination means to the electroplated layer shows that the capacitors are not harmfully damaged during the welding operation. One of the electroplated capacitors has a capacitance (C) of 14.7 $\mu$fd, a dissipation factor (DF) of 5.5%, and DC leakage (DCL) of 0.016 $\mu$a before welding and a C of 14.6 ufd, a DF of 5.5%, and DCL of 0.018 $\mu$a after welding, thereby indicating no sigificant damage to the capacitor due to the welding operation.

EXAMPLE II

Capacitors are electroplated as in EXAMPLE I except that the conducting layer of the capacitor is of a different composition.

The conducting layer is formed on processed capacitors by applying a conventional colloidal graphite suspension to the capacitor and drying suspension and then applying an extra conductive colloidal graphite suspension and drying. The extra conductive colloidal graphite suspension is composed of about 56 parts silver powder, about 100 parts Aquadag E and about 400 parts water, all parts by weight.

The resultant capacitor exhibits characteristics similar to those capacitors of EXAMPLE I.

EXAMPLE III

A capacitor is electroplated with a layer of nickel and the cathode termination means joined to the capacitor at the same time.

A conventionally electroprocessed capacitor is first given two layer of graphite by dipping in an aqueous suspension of colloidal graphite and then drying. A nickel wire which acts as a cathode termination means is brought into contact with the graphite layer and then a silver conducting paint is applied over the cathode termination means and the graphite layer. The capacitor is then electroplated as in EXAMPLE I.

After rinsing and drying, the joint between the cathode termination means and the capacitor exhibits good strength, about twice that of a conventionally soldered connection. Electrical testing reveals equivalent capacitance to that of conventionally soldered capacitors of the same rating and dissipation factor is at an acceptable level.

EXAMPLE IV

A capacitor is electroplated with a conductive layer of copper.

An electroplating solution of about 120 parts copper sulfate, about 10 parts boric acid in 400 parts water is prepared and the pH adjusted to about 4.0 with ammonia and then poured into a plating vessel similar to the one shown in FIG. 1 of the drawing. A capacitor having a CV product of about 3400 is placed into the vessel and the appropriate electrical connections made. The capacitor is electroplated for about seven minutes with about one ampere current flowing into the plating solution. The final electroplated layer is about 0.005 inches in thickness. After removing the capacitor from the vessel and rinsing and drying, the capacitor is tested for electrical characteristics and is found to have acceptable capacitance, dissipation factor, and DC leakage. The electroplated layer of copper is smooth and hard and covers substantially all of the capacitor.

Thus the present invention comprehends a method of electroplating solid electrolyte film-forming metal capacitors with a conducting layer which contains metal. The electroplated conducting layer provides increased shock resistance to the capacitor, allows the capacitor to withstand higher temperatures and helps to reduce other problems associated with conventional solder conducting layers such as solder peeling and the need for long flux rinsing operations. The electroplated conducting layer also allows the cathode termination means to be attached to the capacitor by welding or electroplating.

While the present invention has been described with reference to particular embodiments thereof, it will be understood that numerous modifications may be made by those skilled in the art without actually departing from the spirit and scope of the invention as defined in the appended claims.

What is claimed is:

1. A method of depositing material over an electrode comprising the steps of providing a first electrode with a dielectric oxide film thereover and a second electrode contiguous to the dielectric oxide film, maintaining the voltage potential of the first electrode different from the voltage potential of the second electrode to retain the dielectric nature of the oxide film during deposition of material over the second electrode, and depositing material from a fluid over the second electrode using electrical forces.

2. The method of claim 1 wherein the electrical forces are static electrical forces.

3. The method of claim 1 wherein the electrical forces are produced by switching direct current.

4. The method of claim 1 wherein the electrical forces are produced by intermittent direct current.

5. In a method of making an electrolytic film-forming metal capacitor, the steps comprising the steps of providing a film-forming metal capacitor including a anode termination means and a anode body, the anode body having a dielectric oxide layer, a semiconductive layer over the dielectric oxide layer and a conductive layer over the semiconductive layer and providing a voltage source having a positive and negative terminal, placing the capacitor in an electroplating vessel which contains a plating source and an electroplating solution which contains metal ions, electrically connecting the positive terminal to the anode termination means and the plating source and the negative terminal to the conducting layer on the anode body, electroplating a layer containing metal over the anode body by applying a voltage, and removing the electroplated capacitor from the vessel.

6. In the method of claim 5 wherein the electroplating solution contains ions of metals selected from the group consisting of silver, gold, copper, nickel and mixtures thereof.

7. In the method of claim 6 wherein the electroplating solution has a pH of about 3.0 to about 9.0.

8. In the method of claim 7 wherein the electroplating solution contains nickel sulfamate and an acid.

9. In a method according to claim 5 wherein the conducting layer over the anode body contains graphite.

10. In a method according to claim 5 wherein the conducting layer on the anode body contains a metal selected from the group consisting of silver, tin, copper or mixtures thereof.

11. In the method of claim 5 wherein the plating source contains a metal selected from the group consisting of silver, gold, copper, nickel and mixtures thereof.

12. In the method of claim 5 wherein the film-forming metal of the anode body is selected from the group consisting of aluminum, titanium, zirconium, niobium and tantalum.

13. In the method of claim 12 wherein the semiconducting layer contains manganese dioxide and the film-forming metal is tantalum.

14. In the method of claim 5 wherein switching means are provided to alter the voltage applied to the plating source and the negative terminal connected to the conducting layer on the anode body.

15. In the method of claim 5, wherein electrical current flowing to the anode termination means is limited to such an extent that the capacitor is not harmfully affected.

* * * * *

UNITED STATES PATENT OFFICE
CERTIFICATE OF CORRECTION

Patent No. 4,000,046            Dated December 28, 1976

Inventor(s) Charles A. Weaver

It is certified that error appears in the above-identified patent and that said Letters Patent are hereby corrected as shown below:

Column 1, line 61 delete "as"

Column 3, line 38 delete "comprising" and insert -- comprisses --.

Column 5, line 24 delete "time" and insert -- rule --.

Column 6, line 35 delete "sivler" and insert -- silver --.

Signed and Sealed this sixteenth Day of August 1977

[SEAL]

Attest:

RUTH C. MASON
*Attesting Officer*

C. MARSHALL DANN
*Commissioner of Patents and Trademarks*